UNITED STATES PATENT OFFICE.

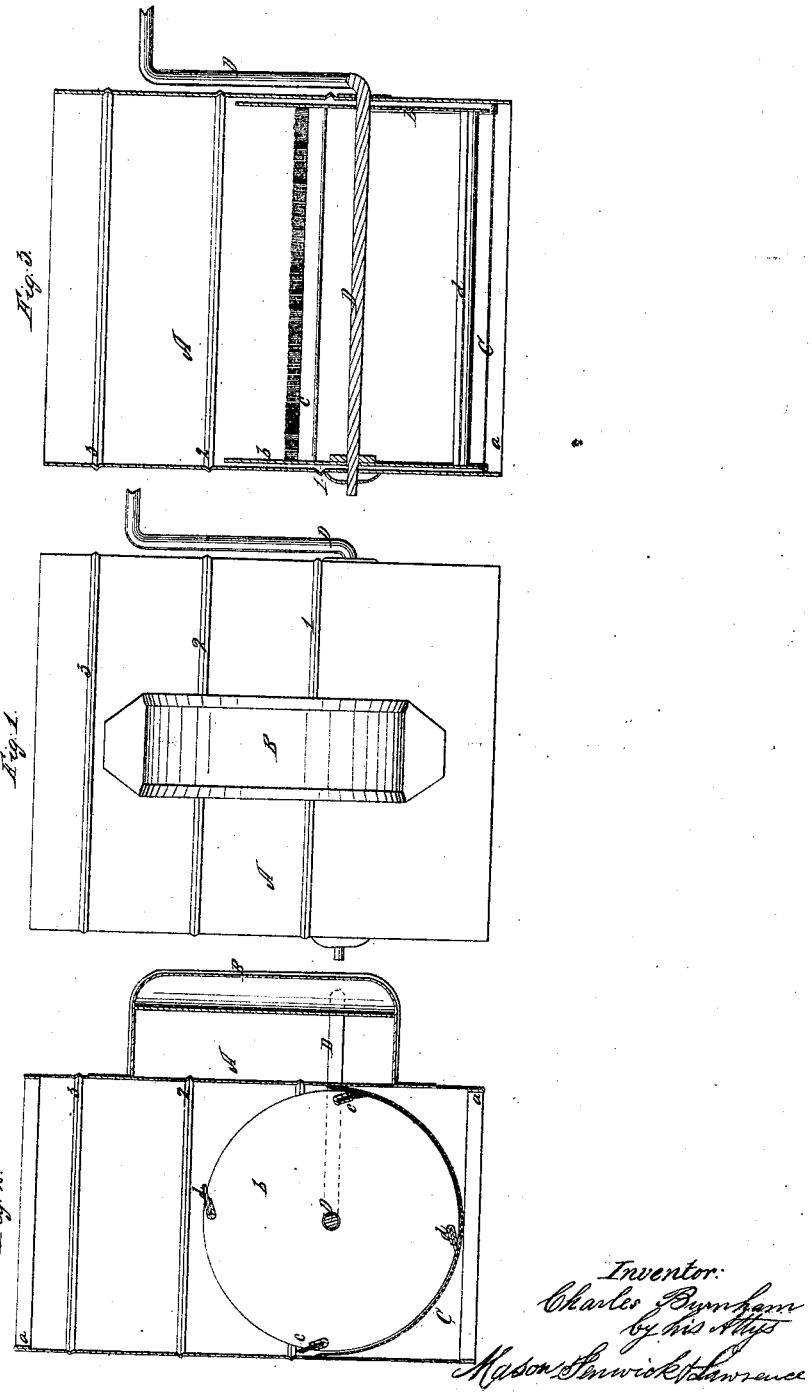

CHARLES BURNHAM, OF PHILADELPHIA, PENNSYLVANIA.

IMPROVED FLOUR-SIFTER.

Specification forming part of Letters Patent No. 54,106, dated April 24, 1866.

*To all whom it may concern:*

Be it known that I, CHARLES BURNHAM, of Philadelphia, in the county of Philadelphia and State of Pennsylvania, have invented a new and useful Improvement in Portable Self-Measuring Flour Sifters and Scoops; and I do hereby declare that the following is a full, clear, and exact description of the same, reference being had to the accompanying drawings, forming part of this specification, in which—

Figure 1 is an external elevation of my improved portable measuring sifter and scoop. Fig. 2 is a vertical cross-section of the same, and Fig. 3 is a vertical longitudinal section of the same.

Similar letters of reference in the several figures indicate corresponding parts.

The nature of my invention consists in the construction of the rectangular box with ribs, grooves, or lines, which designate quantities, and with a handle, a wire concave sieve, and a rubber made of brushes, and elastic scrapers, all as hereinafter described.

To enable others skilled in the art to make and use my invention, I will proceed to describe the same with references to the drawings.

A is a rectangular box, grooved or milled on its inner circumference, as indicated at 1 2 3. These grooves are at a uniform distance apart and run horizontally. The distances between the grooves are to designate quantities. For instance, the distance from bottom of the sieve to 1 is to indicate one pound, the distance from same point to 2 is to indicate two pounds, and so on. Other modes of making the impressions for indicating quantities on the box may be adopted—for instance, mere lines with numerical figures will answer.

This box is shown of an oblong form, and I prefer to make it thus. It being made without a bottom or a top, its upper and lower edges or ends are stiffened by lapping the metal, as shown at *a a*. On one of its widest sides a handle, B, is fastened to it, so that it may be manipulated in the barrel or sack of flour in the same manner as a scoop is now used. In the lower end of this box a concave wire sieve, C, is placed, as shown. The location of this sieve is such with respect to the lower edge or end of the rectangular box that its lowest portion does not extend down below said edge or end. By thus having the sieve arranged the box can be set down upon a table or other article in an upright position. Just above this sieve a revolving stirrer and scraper is arranged. This stirrer and scraper is composed of two circular heads, *b b*, two tangentially-set wire or bristle brushes, *c c*, and two india-rubber scrapers, *d d*, which are also set tangential to the axis of the heads *b b*. By using brushes of metal wire the flour is effectually loosened up when it has become too much compacted upon the sieve, and the meshes of the sieve do not discharge freely. By using rubber scrapers set tangentially, so that they respectively follow a brush, the flour is pressed through the sieve and kept in such a free condition that the sifting operation is effected in a very thorough and expeditious manner. The tangential set of the brushes and scrapers insures a better hold upon the flour than is secured when they are set radial.

The stirrer and scraper is affixed to a revolving crank-shaft, D, which passes through the ends of the box and through the heads *b b*, as shown, or in any other similar manner. The arrangement of the brushes and scrapers on the heads is such with respect to the sieve that they act with frictional contact upon the surface of the sieve as the shaft is revolved, and thus the flour is compelled to go through the meshes of the sieve, while impurities are held back.

It will be observed that as the handle is on one side and the arm of the stirrer-shaft on one end of the box the apparatus can be held by one hand over a tray or bowl, while the stirrer and scraper is operated with the other hand. It will also be observed that the graduation-marks, although formed on the box itself, are very distinct, and will serve as a perfect gage by which to determine quantities. It will also be observed that the sifter, measurer, and scoop combined is so constructed that it can be set in an upright position upon a table or other article, and thus there is no liability of spilling the flour when it is necessary to set the sifter down and withdraw the hand from it.

The manner in which I have constructed my apparatus enables me to furnish the market with a very cheap and useful new article of manufacture.

What I claim as my invention, and desire to secure by Letters Patent, is—

The combined flour sifter, scoop, and measurer, constructed in the manner as herein described and shown, to wit, with a rectangular box, grooved or ribbed horizontally internally, with a concave sieve within said box, above the lower edge of the box, with a handle on one side of the box, and with a combined stirrer and scraper within the box above the sieve, said stirrer and scraper being formed with rubber strips and wire brushes set tangentially, all in the manner set forth.

CHAS. BURNHAM.

Witnesses:
JOS. G. TAITE,
CHAS. M. FOERING.